(12) United States Patent
Zamani et al.

(10) Patent No.: US 9,800,348 B2
(45) Date of Patent: Oct. 24, 2017

(54) CHROMATIC DISPERSION ESTIMATION FOR DIGITAL COHERENT OPTICAL RECEIVERS

(71) Applicant: Futurewei Technologies, Inc., Plano, TX (US)

(72) Inventors: Mahdi Zamani, Ottawa (CA); Zhuhong Zhang, Ottawa (CA); Chuandong Li, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 4 days.

(21) Appl. No.: 14/546,976

(22) Filed: Nov. 18, 2014

(65) Prior Publication Data
US 2016/0142153 A1   May 19, 2016

(51) Int. Cl.
*H04B 10/61*   (2013.01)

(52) U.S. Cl.
CPC ....... *H04B 10/6161* (2013.01); *H04B 10/613* (2013.01); *H04B 10/614* (2013.01)

(58) Field of Classification Search
CPC .......... H04B 10/07951; H04B 10/6161; H04B 10/2513; H04B 10/142; H04B 10/2507; H04B 10/61–10/64; H04B 2210/25–2210/252; H04J 14/06
See application file for complete search history.

(56) References Cited

U.S. PATENT DOCUMENTS

| | | | | |
|---|---|---|---|---|
| 7,596,323 B1* | 9/2009 | Price | ................. | H04B 10/0775 398/140 |
| 8,953,951 B1* | 2/2015 | Thomas | ............. | H04B 10/6161 398/202 |
| 2002/0123851 A1* | 9/2002 | Kurooka | ............ | H04B 10/2513 702/69 |
| 2007/0189769 A1* | 8/2007 | Mauro | ............... | H04B 10/2525 398/66 |
| 2008/0070521 A1* | 3/2008 | West | .................... | H03G 3/3052 455/136 |
| 2011/0200339 A1* | 8/2011 | Komaki | ................. | H04B 10/61 398/208 |
| 2012/0033965 A1* | 2/2012 | Zhang | .................. | H04B 10/611 398/38 |

(Continued)

FOREIGN PATENT DOCUMENTS

| | | |
|---|---|---|
| CN | 102326343 A | 1/2012 |
| WO | 2014114332 A1 | 7/2014 |

OTHER PUBLICATIONS

Pereira, F., et al., "Experimental Analysis of the Power Auto-Correlation-Based Chromatic Dispersion Estimation Method," IEEE Photonics Journal, vol. 5, No. 4, Aug. 2013, 9 pages.

(Continued)

*Primary Examiner* — David Payne
*Assistant Examiner* — Casey Kretzer
(74) *Attorney, Agent, or Firm* — Conley Rose, P.C.

(57) ABSTRACT

An apparatus comprises a front end configured to receive an optical signal, and convert the optical signal into a plurality of digital signals, and a processing unit coupled to the front end and configured to determine a best-match chromatic dispersion (CD) estimate in the optical signal by optimizing a cost function based on signal peaks of the plurality of digital signals.

26 Claims, 7 Drawing Sheets

(56) References Cited

U.S. PATENT DOCUMENTS

| | | | | |
|---|---|---|---|---|
| 2012/0106982 A1* | 5/2012 | Wagner | ............... | H04B 10/61 398/208 |
| 2013/0045004 A1* | 2/2013 | Geyer | ............... | H04B 10/6161 398/25 |
| 2013/0163988 A1 | 6/2013 | Krongold et al. | | |
| 2014/0294387 A1 | 10/2014 | Hauske et al. | | |
| 2015/0280833 A1* | 10/2015 | Sun | ............... | H04B 10/6162 398/208 |
| 2016/0226596 A1* | 8/2016 | Stojanovic | ......... | H04B 10/6161 |

OTHER PUBLICATIONS

Wang, D., et al., "Adaptive CD Estimation for Coherent Optical Receivers Based on Timing Error Detection," IEEE Photonics Technology Letters, vol. 25, No. 10, May 15, 2013, pp. 985-988.

Sui, Q., et al., "Fast and Robust Blind Chromatic Dispersion Estimation Using Auto-Correlation of Signal Power Waveform for Digital Coherent Systems," Journal of Lightwave Technology, vol. 31, No. 2, Jan. 15, 2013, pp. 306-312.

Wang, D., et al., "Adaptive Chromatic Dispersion Compensation for Coherent Communication Systems Using Delay-Tap Sampling Technique," IEEE Photonics Technology, vol. 23, No. 14, Jul. 15, 2011, pp. 1016-1018.

Hauske, F.N., et al., "Frequency Domain Chromatic Dispersion Estimation," OSA/OFC/NFOEC 2010, JThA11.pdf, Mar. 21-25, 2010, 3 pages.

Yu, Q., et al., "Chromatic Dispersion Monitoring Technique Using Sideband Optical Filtering and Clock Phase-Shift Detection," Journal of Lightwave Technology, vol. 20, No. 12, Dec. 2002, pp. 2267-2271.

Soriano, R., et al., "Chromatic Dispersion Estimation in Digital Coherent Receivers," Journal of Lightwave Technology, vol. 29, No. 11, Jun. 1, 2011, pp. 1627-1637.

Xie, C., et al., "Chromatic Dispersion Estimation for Single-Carrier Coherent Optical Communications," IEEE Photonics Technology Letters, vol. 25, No. 10, May 15, 2013, pp. 992-995.

Wymeersch, H., et al., "Maximum Likelihood-Based Blind Dispersion Estimation for Coherent Optical Communication," Journal of Lightwave Technology, vol. 30, No. 18, Jul. 24, 2012, 8 pages.

Foreign Communication From a Counterpart Application, PCT Application No. PCT/CN2015/094805, International Search Report dated Feb. 4, 2016, 7 pages.

Foreign Communication From a Counterpart Application, PCT Application No. PCT/CN2015/094805, Written Opinion dated Feb. 4, 2016, 4 pages.

* cited by examiner

CHROMATIC DISPERSION ESTIMATION FOR DIGITAL COHERENT OPTICAL RECEIVERS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical communication systems are widely used for data communication. An optical communication system may comprise an optical transmitter, a channel (e.g., optical fibers), and an optical receiver. The optical transmitter may encode data onto an optical signal, the channel may carry the optical signal from the transmitter to the receiver, and the receiver may recover the data from the received optical signal. One type of optical communication system may be a long-haul optical communication system, in which data may be carried through optical transmission links and/or optical fibers that span long distances. Long-haul optical communication systems may increase data rates by employing coherent optical transmissions, in which data may be modulated onto amplitudes, phases, and/or polarization components of an optical carrier signal.

In long-haul optical communication systems, the system performance may be limited by inter-symbol interference (ISI), which may be caused by fiber-optic impairments, such as chromatic dispersion (CD), polarization mode dispersion (PMD), phase noise, non-linear effects, etc. For example, CD may cause different spectral components (e.g., wavelengths) in a light signal to travel through an optical fiber at different speeds and arrive at a receiver at different time instants, and thus may broaden the light pulses that carry the data and lead to ISI. Some systems may compensate CD in a fiber by employing another fiber of opposite-sign dispersion, but may be at the expense of an increased non-linearity effect. Recent advances in high-speed analog-to-digital converters (ADCs) and/or digital-to-analog converters (DACs) and high performance digital signal processors (DSPs) have enabled fiber-optic impairments to be compensated digitally in DSPs.

SUMMARY

In one embodiment, the disclosure includes an apparatus comprises a front end configured to receive an optical signal, and convert the optical signal into a plurality of digital signals, and a processing unit coupled to the front end and configured to determine a best-match CD estimate in the optical signal by optimizing a cost function based on signal peaks of the plurality of digital signals.

In another embodiment, the disclosure includes a method for estimating CD in an optical device coupled to an optical transmission link, the method comprising receiving an optical signal via the optical transmission link, converting the optical signal into a plurality of digital signals, and determining a best-match CD estimate associated with the optical signal by optimizing a cost function based on signal peaks of the plurality of digital signals.

In yet another embodiment, the disclosure includes a coherent optical receiver comprising a front end configured to receive an optical signal, and convert the optical signal into a plurality of digital electrical signals, one or more frequency domain equalizers (FDEQs) coupled to an output of the front end and configured to compensate CD in the optical signal, and a CD estimation (CDE) unit coupled to the FDEQs and configured to determine a best-match CD estimate associated with the optical signal by optimizing a cost function based on a summation of signal peaks, wherein the best-match CD estimate is used by the FDEQs to compensate the CD in the optical signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
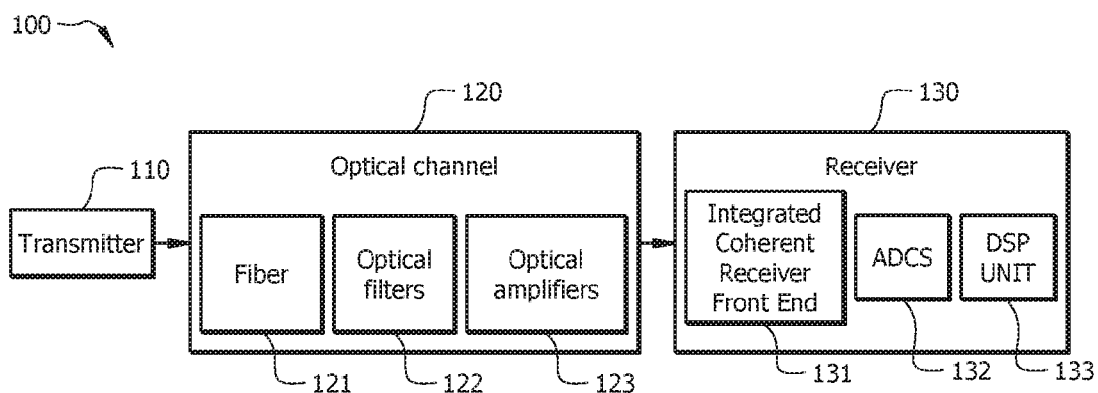
FIG. 1 is a schematic diagram of an embodiment of an optical transportation link.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

FDEQs may be widely employed for CD compensation in digital coherent optical receivers due to the low computational complexity for compensating CD with large dispersions and in long fiber distances. CD may be quasi-static for a given optical channel (e.g., a transmission link with fixed fiber type and fiber length) and may affect the phase of a signal in the frequency domain, where the phase may vary according to the amount of CD in the optical channel. Thus, in order to reverse the effect of CD, a receiver may configure the FDEQs to match the inverse function of the CD effect or the CD impulse response, for example, by adjusting FDEQ tap coefficients. However, the receiver may not have prior knowledge of the amount of CD effect. Thus, the receiver may estimate the amount of CD in the optical channel during an initial acquisition stage, for example, based on a received optical signal propagated through the optical channel. After estimating the CD in the received optical signal, the receiver may configure the FDEQs according to the CD estimate such that the FDEQs may substantially compensate the CD in subsequent received signals.

Disclosed herein are mechanisms for efficiently estimating CD at a digital coherent optical receiver. The disclosed CDE may employ a best search approach by sweeping a range of FDEQs configured to compensate a range of CD candidates in a received optical signal and computing a signal-peak-based cost function to determine an optimum CD candidate that substantially matches the CD effect in the received optical signal. At each FDEQ sweep, the FDEQ may be configured to compensate one of the CD candidates, the received optical signal may be filtered by the FDEQ, and a goodness measure or cost for the CD candidate may be computed by accumulating signal peaks of the filtered signal. For example, one FDEQ may be applied to each polarization comprising an in-phase (I) component and a quadrature-phase (Q) component. The goodness measure or cost may be computed by accumulating the magnitude of the maximum signal peak of each component of each polarization. The signal-peak-based cost function may operate based on the CD signal spreading effect. For example, when a signal is distorted by CD, the signal may spread, but the signal energy may remain the same, and thus the signal peaks may increase. As such, a CD-compensated signal may comprise smaller signal peaks. Thus, an optimum CDE may be determined by selecting a CD candidate that produces a minimum cost. Since the signal-peak-based CD cost function may not comprise complex operations, such as multiplications and/or divisions, the disclosed CDE mechanisms may be efficient for hardware and/or software implementations.

The disclosed embodiments may be suitable for any optical transceivers, signaling schemes, modulation schemes, detection and/or equalization schemes, and/or multiplexing structures. For example, the signaling schemes may include raised-cosine (RC), root-raised-cosine (RRC), non-return-to-zero (NRZ), and/or return-to-zero with 67 percent duty cycle (RZ67); the modulation schemes may include binary phase shift keying (BPSK), quadrature phase shift keying (QPSK), eight quadrature amplitude modulation (8-QAM), sixteen quadrature amplitude modulation (16-QAM), and/or higher order quadrature amplitude modulation; the detection and/or equalization schemes may include transmit pre-compensation, PMD compensation, and automatic spontaneous emission (ASE) noise compensation; and the multiplexing structures may include frequency-division multiplexing (FDM) and/or wavelength-division multiplexing (WDM). In addition, the disclosed embodiments may provide robust CDEs in the presence of narrow band electrical filtering, networks with a large number of WSSs, a large local oscillator frequency offset (LOFO), a high parts-per-million (PPM) local oscillator (LO), high channel impairments, large ASE, etc.

FIG. 1 is a schematic diagram of an embodiment of an optical transportation link 100. The optical transportation link 100 may comprise a transmitter 110 communicatively coupled to a coherent receiver 130 through an optical propagation channel 120. The transmitter 110 may be located on a transmitting side of the link 100 and may be configured to send optical signals to the receiver 130 located on a receiving side of the optical link 100 via the channel 120. The channel 120 may represent a transmission link in an optical communication network and may carry upstream and/or downstream transmission signals between a central office (CO) and a customer-premises equipment (CPE). For example, the transmitter 110 may reside at the CO and the receiver 130 may reside at the CPE for downstream transmission, whereas for upstream transmission, the transmitter 110 may reside at the CPE and the receiver 130 may reside at the CO. An optical transceiver at a CO and/or a CPE may comprise both the transmitter 110 and the receiver 130 in order to facilitate bi-directional data communications.

The transmitter 110 may comprise electrical-to-optical (E/O) components (not shown), such as electrical drivers, E/O converters, and/or a laser. The E/O components may modulate electrical signals onto an optical carrier provided by the laser. For example, the transmitter 110 may transmit an optical signal comprising two orthogonal linear-polarization components, an X-polarization component and a Y-polarization component. Each-polarization component may comprise two orthogonal phase components, an I component and a Q component, both comprising the same optical carrier frequency. The carrier frequency may be an optical wavelength supplied by the laser with phase noise.

The channel 120 may comprise fiber 121, optical filters 122, optical amplifiers 123, and/or other components. The optical channel 120 may comprise various types of channel impairments, for example, CD, non-linear phase noise, PMD, polarization dependent loss (PDL), polarization dependent gain, state-of-polarization (SOP) rotations, and optical white Gaussian noise. In addition to the channel impairments, the imperfections of components in the transmitter 110 and/or the receiver 120 and/or the mismatches between the transmitter 110 and the receiver 120, such as LOFO, LO inaccuracies, in-phase and quadrature-phase (IQ) imbalance, etc., may contribute to the noise received at the receiver 130.

The receiver 130 may comprise an integrated coherent receiver front end 131, one or more ADCs 132, and a DSP unit 133. The receiver 130 may be configured to receive an optical signal transmitted by the transmitter 110 and propagated through the channel 120. The integrated coherent receiver 131 may be configured to convert the received optical signal into one or more electrical signals. For example, the integrated coherent receiver 131 may comprise a LO (not shown) and/or mixers (not shown). In the integrated coherent receiver 131, the LO, which may have a frequency that closely matches the laser at the transmitter 110, may mix with the propagated optical signal and split the propagated optical signal into four electrical signals (e.g., I and Q components for each X- and Y-polarization) with each split signal being a mixture of the transmitted signal. The ADCs 132 may be coupled to the integrated coherent receiver 131 and configured to convert the electrical signals into digital signals. It should be noted that the integrated coherent receiver front end 131 and the ADCs 132 may be referred to as the front end.

The DSP unit 133 may be coupled to the ADCs 132 and may comprise one or more processors, which may include general processors, single-core processors, multi-core processors, application-specific integrated circuits (ASICs), and/or DSPs. The DSP unit 133 may be configured to process the digital signals to recover data transmitted by the transmitter 110. The DSP unit 133 may compensate channel impairments caused by the channel 120 and/or hardware impairments caused by imperfections and/or mismatches in the hardware components between the transmitter 110 and the receiver 130. In some embodiments, the receiver 130 may employ a general processing unit instead of a DSP unit 133, for example, when the general processing unit provides sufficient processing speed and meets the power consumption requirements of the receiver 130. The general processing unit may comprise one or more general processors, single-core processors, multi-core processors, and/or ASICs.

In an embodiment, the optical transportation link 100 may be a long-haul transmission link. In order to compensate all channel impairments in a single equalizer, the DSP unit 133 may employ a multiple-input and multiple-output infinite impulse response (MIMO-IIR) adaptive equalizer with a large number of taps. However, such an equalizer may be computationally complex and may be expensive to implement in hardware and/or software. One simpler approach may be to implement several different equalizers, each specifically designed to compensate a particular impairment based on the properties and/or the effect of the impairment.

Since CD is a quasi-deterministic impairment (e.g., slow varying or about constant for a given transmission link) with long delays, a static frequency domain zero-forcing equalizer or a mean-square error equalizer, such as an FDEQ, may be suitable for compensating CD. The DSP unit 133 may employ other equalizers and/or circuits, for example, in the time domain, subsequent to the FDEQ to compensate other impairments, such as PMD, PDL, SOP, etc.

Figure 2:
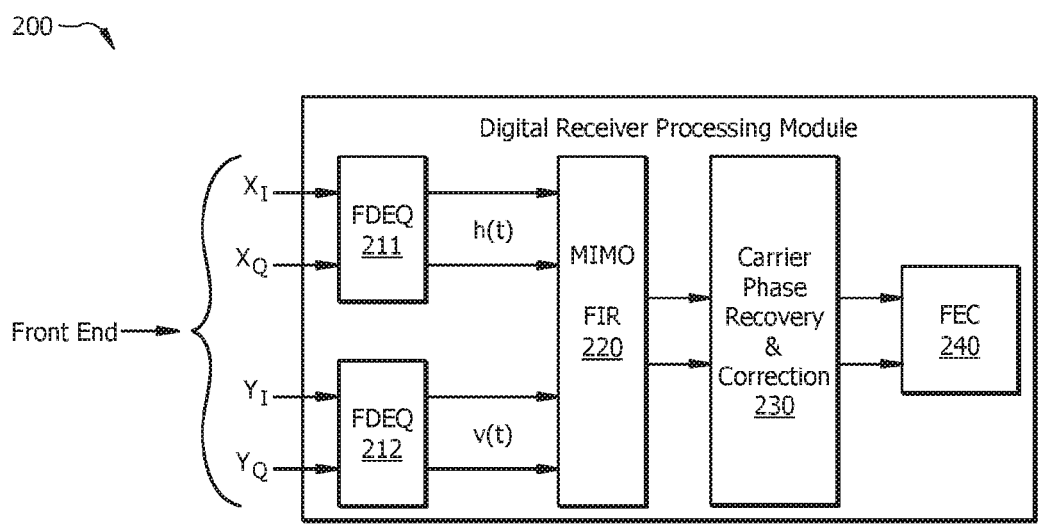
FIG. 2 is a schematic diagram of an embodiment of a digital receiver processing module.

FIG. 2 is a schematic diagram of an embodiment of a digital receiver processing module 200, which may perform substantially similar functions as the DSP unit 133. The digital receiver processing module 200 may be realized in hardware and/or implemented as DSP software components. The digital receiver processing module 200 may be configured to compensate impairments in an optical transportation link, such as link 100. The digital receiver processing module 200 may comprise FDEQs 211 and 212, a MIMO finite impulse response (FIR) unit 220, a carrier phase recovery and correction unit 230, and an forward error correction (FEC) unit 240.

The FDEQs 211 and 212 may be configured as a match filter to reverse the impact of CD caused by an optical propagation channel, such as the channel 120. The FDEQs 211 and 212 may perform CD compensation in the frequency domain. For example, the FDEQs 211 and 212 may compensate CD in a received optical signal by multiplying the I and Q components of an X-polarization component and a Y-polarization component of the received optical signal with a frequency domain filter that is the inverse transfer function of a channel CD response, where the filter may be an all-pass filter with a parabolic phase that matches the amount of CD (e.g., in units of picoseconds per nanometer (ps/nm)) in the channel.

CD compensation may be performed separately for each polarization. For example, the FDEQ 211 may compensate CD in the X-polarization component by processing the corresponding I and Q components, denoted as $X_I$ and $X_Q$, respectively, and the FDEQ 212 may compensate CD in the Y-polarization component by processing the corresponding I and Q components, denoted as $Y_I$ and $Y_Q$, respectively. In addition, each FDEQ 211 and 212 may comprise a fast Fourier transform (FFT) unit that converts the I and Q components in the corresponding polarization into frequency domain signals prior to multiplying with the frequency domain filter and an inverse FFT (IFFT) unit that converts the filtered signals into the time domain. As such, in order to match the inverse channel CD response, the digital receiver processing module 200 may configure the filter by adjusting the filter tap coefficients according to the amount of CD.

The MIMO FIR unit 220 may be coupled to the FDEQs 211 and 212 and may be configured to perform PMD and/or SOP equalization on the CD compensated X and Y-polarization signals, denoted as h(t) and v(t), respectively, each comprising a real component and an imaginary component. The carrier phase recovery and correction unit 230 may be coupled to the MIMO FIR unit 220 and configured to compensate laser line-width, low frequency laser phase noise, and/or low frequency fiber non-linearity phase noise. The FEC unit 240 may be coupled to the carrier phase recovery and correction unit 230 and configured to perform error correction according to predetermined error correcting codes.

As described above, the frequency domain filters in the FDEQs 211 and 212 may be configured to match the amount of CD in the channel. However, since the FDEQs 211 and 212 may be the first digital processing stage in the digital receiver processing module 200, the digital receiver processing module 200 may not have prior knowledge of the amount of CD effect. As such, the digital receiver processing module 200 may estimate the CD effect in the presence of other impairments. The accuracies of the CD estimate may affect the performance of the digital receiver processing module 200 significantly since large CD error may not be removed by any other equalizers subsequent to the FDEQs 211 and 212 and may cause data decoding failure in the digital receiver processing module 200.

Several CDE methods may employ brute force or best-search mechanisms to blindly estimate CD from a received optical signal in the digital domain by sweeping over a range of CD candidate values, evaluating a cost function for each CD candidate value, and optimizing the cost function. For example, the cost function may be based on CT energy as described in R. Soriano, et al., "Chromatic Dispersion Estimation in Digital Coherent Receivers," Journal of Lightwave Technology, Vol. 29, No. 11, pp. 1627-1637, Jun. 1, 2011 and F. N. Hauske, et al., "Frequency Domain Chromatic Dispersion Estimation," Optical Society of America, 2010 which are incorporated by reference. Alternatively, the cost function may be based on PAPR as described in C. Xie, "Chromatic Dispersion Estimation for Single-Carrier Coherent Optical Communications," Institute of Electrical and Electronics Engineers (IEEE) Photonic Technology Letters, Vol. 25, No. 10, May 15, 2013, which is incorporated by reference.

The CT-energy-based cost function may evaluate the energy of a CT in a RC pulse-shaped signal spectrum at frequencies of about $\pm\frac{1}{2} f_B$, where $f_B$ is the signal baud rate. When the CD is estimated correctly and the CD effect is substantially compensated, the CT may comprise the highest amount of energy. However, in the presence of other impairments, such as LOFO (e.g., shifts the CT frequency), PMD (e.g., at about 0.5 unit interval (UI) differential group delay (DGD), and/or SOP rotations, the CT-energy-based cost function may not provide an accurate CD estimate. In order to overcome such impairments, the CT-energy-based cost function may be modified to include metric measurements for multiple frequency tones to overcome the LOFO and/or various combinations of signals, for example, by defining two signals x(t)=h(t)+v(t−1) and y(t)=h(t)+v(t+1) or four signals x(t), y(t), x(t)+y(t), and x(t)−y(t) for metric measurements to overcome the PMD or SOP, respectively, where h(t) and v(t) are the outputs of the FDEQs 211 and 212, respectively. However, the CT-energy-based or modified cost functions may be limited by electrical and/or optical bandwidth as the system data rate increases (e.g., with higher baud rates).

The PAPR-based cost function may be less noise limiting, but may comprise high computational complexity. The PAPR-based cost function, $J_{CD\_PAPR}$, may be computed as shown below:

$$J_{CD\_PAPR} = \frac{\max(|real(h)|^2 + |imag(h)|^2)}{mean(|real(h)|^2 + |imag(h)|^2)} + \frac{\max(|real(v)|^2 + |imag(v)|^2)}{mean(|real(v)|^2 + |imag(v)|^2)}, \quad (1)$$

where real(h) and imag(h) may represent the real and imaginary components of the FDEQ 211 output h(t) and real(v) and imag(v) may represent the real and imaginary components of the FDEQ 212 output v(t). As can be seen from equation (1), the PAPR-based cost function may comprise multiplications and divisions.

Some other CDE methods may be based on autocorrelation of signal power as described in F. C. Pereira, et al., "Experimental Analysis of the Power Auto-Correlation-Based Chromatic Dispersion Estimation Method," IEEE Photonics Journal, Vol. 5, No. 4, August 2013 and Q. Sui, et al., "Fast and Robust Blind Chromatic Dispersion Estimation Using Auto-Correlation of Signal Power Waveform for Digital Coherent Systems," Journal of Lightwave Technology, Vol. 31, No. 2, pp. 306-312, Jan. 15, 2013, which are incorporated by reference, or may employ constant modulus algorithm (CMA) and/or maximum-likelihood (ML) estimator as described in H. Wymeersch, et. al, "Maximum Likelihood-Based Blind Dispersion Estimation for Coherent Optical Communication," Journal of Lightwave Technology, Vol. 30, No. 18, pp. 2976-2982, 2012, which is incorporated by reference. However, such methods may be slow to converge, for example, converge after processing many blocks of samples; computationally complex; and/or may not perform well when compensating high CD.

Figure 3:
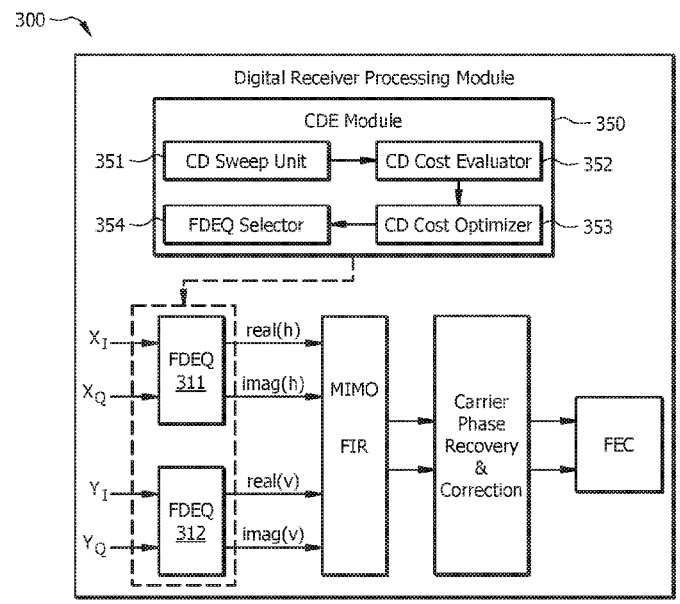
FIG. 3 is a schematic diagram of another embodiment of a digital receiver processing module.

FIG. 3 is a schematic diagram of another embodiment of a digital receiver processing module 300. The digital receiver processing module 300 may be substantially similar to the digital receiver processing module 200, but may comprise a CDE module 350. The CDE module 350 may be configured to estimate the effect of CD in a received optical signal and compute optimum tap coefficients for FDEQs 311 and 312, which may be substantially similar to FDEQs 211 and 212, respectively. The CDE module 350 may comprise a CD sweep unit 351, a CD cost evaluator 352, a CD cost optimizer 353, and a FDEQ selector 354.

The CD sweep unit 351 may be configured to scan a plurality of CD candidate values, for example, in a range of N CD candidate values from CD_comp(i) to CD_comp(N−1), where N may be any positive integer. For each CD_comp(i), the CD sweep unit 351 may compute tap coefficients for the FDEQs 311 and 312 according to CD_comp(i) such that the FDEQs 311 and 312 may compensate the CD effect of CD_comp(i) in an X-polarization (e.g., shown as $X_I$ and $X_Q$) and a Y-polarization (e.g., shown as $Y_I$ and $Y_Q$) of the received signal, respectively. For example, each FDEQ 311 and/or 312 may comprise a filter response or transfer function that matches the inverse impulse response caused by CD_comp(i). After computing the tap coefficients, the CD sweep unit 351 may filter the received optical signal with the FDEQs 311 and 312. As an example, the range of CD candidate values may range based on applications, for example, from about −40,000 ps/nm to about 250,000 ps/nm and may be in steps of about 100 ps/nm. However, the CD candidate value range and/or the step may be alternatively configured as determined by a person of ordinary skill in the art to achieve the same functionalities.

The CD cost evaluator 352 may be coupled to the CD sweep unit 351 and configured to compute and store a metric or a cost for each filtered signal according to a cost function. Since CD may cause a signal to spread, but may not change the signal energy, signal peaks may increase as the amount of CD increases. As such, the effectiveness of CD compensation may be measured by monitoring signal peaks. When the FDEQs 311 and 312 are configured with an optimum CD value, the FDEQs 311 and 312 may produce signals with smallest signal peaks.

A signal-peak-based cost function may be defined as shown below:

$$J_{CD}(i) = \max(|real(h)|) + \max(|imag(h)|) + \max(|real(v)|) + \max(|imag(v)|), \text{tm} \quad (2)$$

where $J_{CD}(i)$ represents the CD cost for the FDEQs 311 and 312 corresponding to CD_comp(i), real(h) and imag(h) represent the real and imaginary components of the FDEQ 311 output in the X-polarization component and real(v) and imag(v) represent the real and imaginary components the FDEQ 312 output in the Y-polarization component.

The CD cost optimizer 353 may be coupled to the CD cost evaluator 352 and configured to search for a best-match CD estimate, CD_best, that produces a filtered signal with a minimum cost or smallest $J_{CD}$ value. The FDEQ selector 354 may be coupled to the CD cost optimizer 353 and configured to select and/or compute tap coefficients for the FDEQs 311 and 312 according to the best-match CD estimate CD_best. It should be noted that the disclosed embodiments may describe the CDE module 350 in the context of dual polarizations. However, the disclosed CDE mechanisms may be suitable for any digital coherent optical receiver comprising one or more polarizations. It should be noted that the CDE module 350 may or may not be implemented on a same DSP unit and/or processor as the FDEQs 311 and/or 312 and the components in the digital receiver processing module 300 may be alternatively configured as determined by a person of ordinary skill in the art to achieve the same functionalities.

Figure 4:
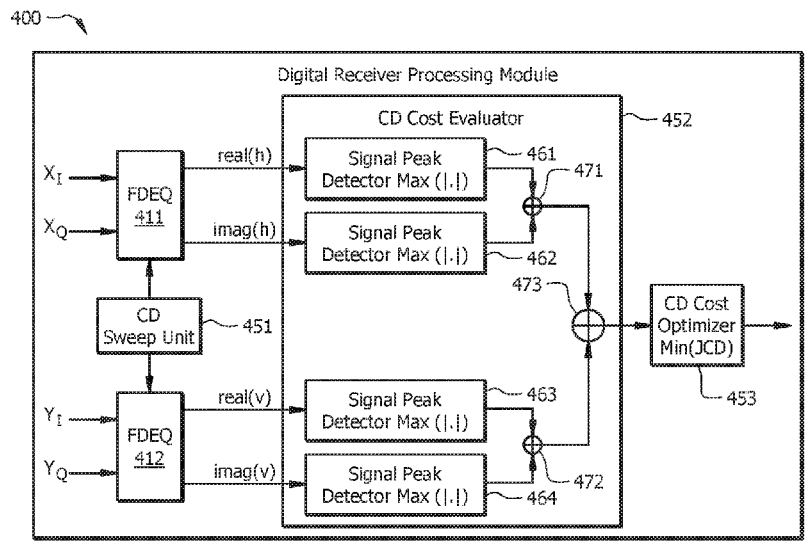
FIG. 4 is a schematic diagram of an embodiment of another digital receiver processing module.

FIG. 4 is a schematic diagram of an embodiment of another digital receiver processing module 400. The digital receiver processing module 400 may be substantially similar to the digital receiver processing module 300, but may provide a more detailed view. The digital receiver processing module 400 may comprise FDEQs 411 and 412, a CD sweep unit 451, a CD cost evaluator unit 452, and a CD cost optimizer 453, which may be substantially similar to FDEQs 311 and 312, CD sweep unit 351, CD cost evaluator 352, and CD cost optimizer 353, respectively.

The CD cost evaluator 452 may comprise a plurality of signal peak detectors 461, 462, 463, and 464, and accumulators 471, 472, and 473. The CD cost evaluator 452 may compute a cost for each CD candidate value according to Equation (2) described above by processing the output signals real(h) and imag(h) of the FDEQ 411 and real(v) and imag(v) of the FDEQ 412, in which the filter in each FDEQ 411 and 412 may be configured to match the inverse of the corresponding CD candidate value. The signal peak detectors 461, 462, 463, and 464, each may comprise a maximum operator, denoted as max(|•|), that finds a signal peak with a maximum magnitude in the output signals. For example, the signal peak detectors 461 and 462 may be coupled to the output of the FDEQ 411 and configured to find a signal peak with a maximum magnitude for each signal real(h) and imag(h), respectively, in the X-polarization component. Similarly, the signal peak detectors 463 and 464 may be coupled to the output of the FDEQ 412 and configured to find a signal peak with a maximum magnitude for each signal real(v) and imag(v), respectively, in the Y-polarization component. The accumulator 471 may accumulate the signal peaks from the signal detectors 461 and 462 to produce a signal peak sum for the X-polarization component. The accumulator 472 may accumulate the signal peaks from the signal detectors 463 and 464 to produce a signal peak sum for the Y-polarization component. The accumulator 473 may accumulate the X-polarization component signal peak sum and the Y-polarization component signal peak sum to produce a cost or metric for a corresponding CD candidate value.

The CD optimizer 453 may be coupled to the CD cost evaluator 452, particularly the accumulator 473, and may comprise a minimum cost operator, denoted as $\text{Min}(J_{CD})$. The CD optimizer 453 may be configured to find a minimum cost value among the costs of all the CD candidate values, where the CD candidate value that produces the minimum cost corresponds to the best-match CD estimate and may be employed to configure the FDEQs 411 and 412 for subsequent receiver processing.

Figure 5:
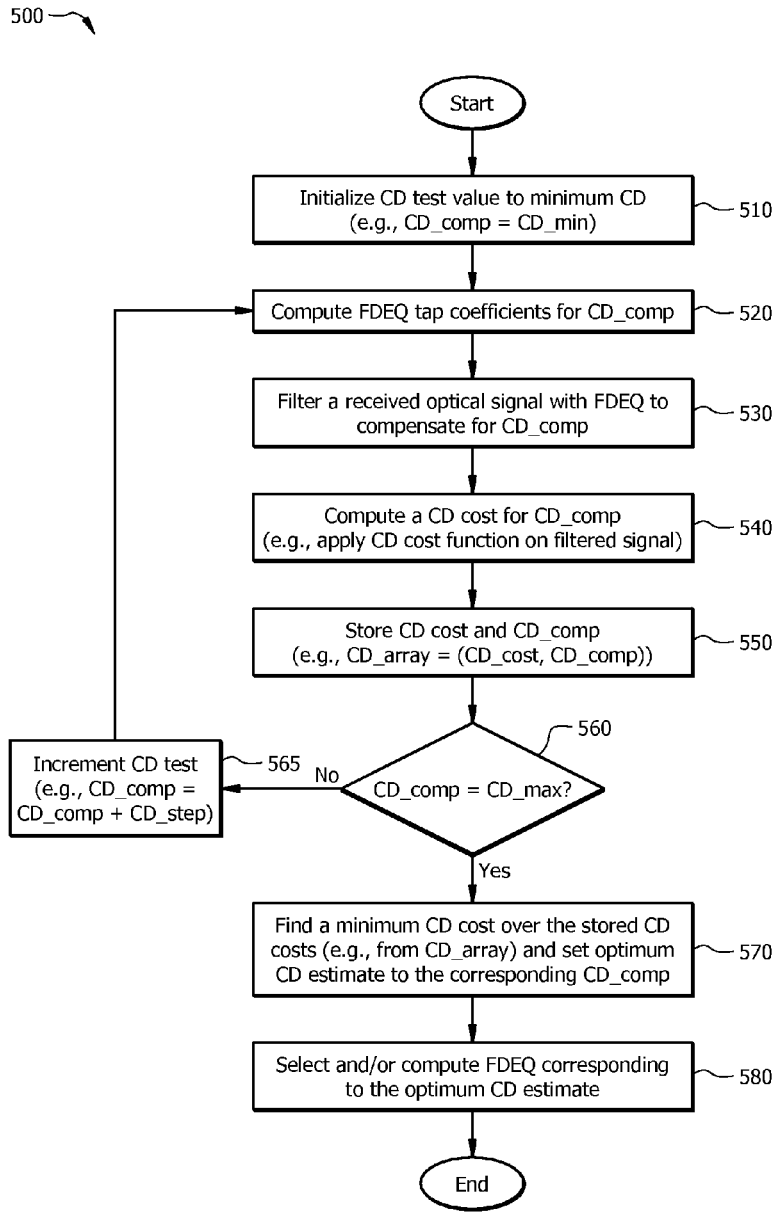
FIG. 5 is a flowchart of an embodiment of a method for estimating CD.

FIG. 5 is a flowchart of an embodiment of a method 500 for estimating CD. The method 500 may be implemented in a DSP unit, such as the DSP unit 133, and/or the digital receiver processing module 200 and/or 300. The method 500 may perform substantially similar CDE mechanisms as described with respect to the digital receiver processing modules 300, 400. The method 500 may be performed during an initial acquisition stage prior to data processing. The method 500 may estimate the amount of CD in a received optical signal propagated through a channel, such as channel 120. For example, the method 500 may begin with a range of CD candidate values selected based on network configurations, for example, a long-haul transmission system with long optical fibers. The CD candidate values may range from a minimum CD candidate value, denoted as CD_min, to a maximum CD candidate value, denoted as CD_max, in increments of CD_step.

At step 510, method 500 may initialize a CD compensation value, CD_comp, to CD_min. At step 520, method 500 may compute filter tap coefficients for an FDEQ according to CD_comp such that the FDEQ may compensate CD_comp in the received optical signal.

At step 530, method 500 may filter the received optical signal with the FDEQ to compensate CD_comp in the received optical signal. The method 500 may employ one FDEQ for each polarization component of the received optical signal. As described above, the FDEQ may convert the received signal into the frequency domain, apply the FDEQ filter to the frequency domain signal, and then convert the filtered signal into the time domain.

At step 540, after filtering the received signal, method 500 may compute a CD cost for CD_comp by evaluating the signal-peak-based cost function as described above in Equation (2) for the filtered signal. For example, method 500 may accumulate a maximum signal peak magnitude of each real and imaginary components of each polarization component. At step 550, method 500 may store the CD cost and the corresponding CD_comp, for example, in an array CD_array.

At step 560, method 500 may determine whether CD_comp reaches CD_max. If CD_comp is not equal to CD_max, method 500 may proceed to step 565. At step 565, method 500 may increment CD_comp by CD_step and return to step 520.

If CD_comp is equal to CD_max at step 560, method 500 may proceed to step 570. At step 570, method 500 may search for a minimum CD cost over the stored CD costs, for example, in the CD_array that stores each CD_comp and a corresponding CD cost. The CD candidate value CD_comp that produces the minimum CD cost may be the best-match CD estimate CD_best for the received optical signal. At step 580, method 500 may select and/or compute the optimum FDEQ that corresponds to the best-match CD estimate such that the optimum FDEQ may substantially remove the CD effect in the received optical signal.

Figure 6:
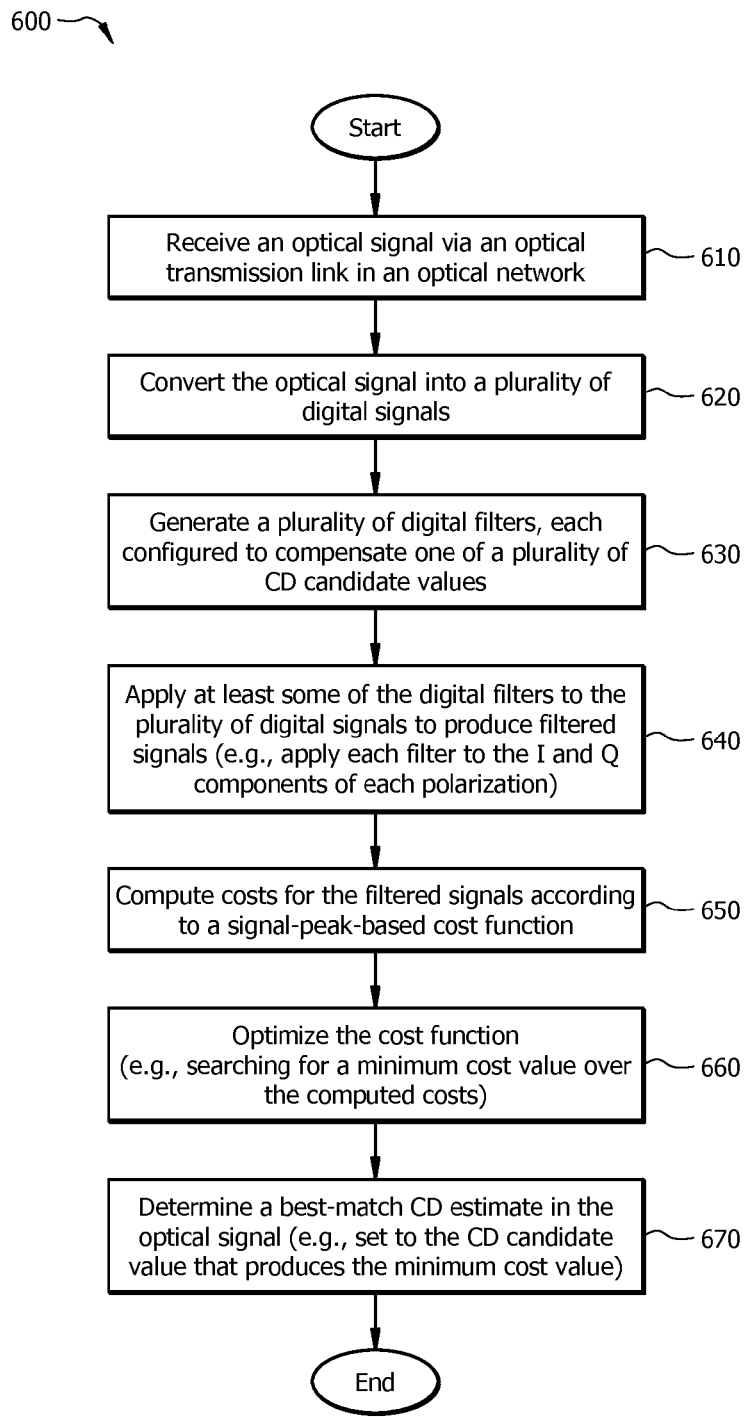
FIG. 6 is a flowchart of another embodiment of a method for estimating CD.

FIG. 6 is a flowchart of an embodiment of a method 600 for estimating CD. The method 600 may be similar to the method 500 and may be implemented in a DSP unit, such as the DSP unit 133, and/or the digital receiver processing module 200 and/or 300. At step 610, method 600 may begin with receiving an optical signal via an optical transmission link, such as the link 100, in an optical network. At step 620, method 600 may convert the optical signal into a plurality of digital signals. For example, the digital signals may comprise one or more polarization components, each comprising an I component and a Q component.

At step 630, method 600 may generate a plurality of digital filters, each configured to compensate one of a plurality of CD candidate values. For example, the CD candidate values may range from a minimum CD candidate value to a maximum CD candidate value associated with the configuration of the optical network.

At step 640, method 600 may apply the digital filters to the digital signals to produce filtered signals. For example, method 600 may apply each digital filter to the I and Q components of each polarization component to produce a filtered signal comprising a real component and an imaginary component.

At step 650, method 600 may compute costs for the CD candidate values from the filtered signals according to the signal-peak-based cost function as described in Equation (2). At step 660, method 600 may optimize the cost function by searching for a minimum cost value over the computed costs.

At step 670, method 600 may determine a best-match CD estimate for the optical signal by setting the best-match CD estimate to a CD candidate value that produces the minimum cost value.

Figure 7:
FIG. 7 illustrates an embodiment of a table comparing DSP complexity for a clock-tone (CT)-energy-based CDE method, a peak-to-average power ratio (PAPR)-based CDE method, and a signal-peak-based CDE method.

FIG. 7 illustrates an embodiment of a table 700 comparing DSP complexity for a CT-energy-based CDE method, a PAPR-based CDE method, and a signal-peak-based CDE method. The table 700 compares DSP complexity in terms of the number of multiplications, divisions, and/or squared operations. In table 700, column 710 shows the number of operations for the CT-energy-based CDE method, column 720 shows the number of operations for the PAPR-based CDE method, and column 730 shows the number of operations for the signal-peak-based CDE method. The CT-energy-based CDE method may process about 64 blocks of 48 sample points to obtain a converged CD estimate. The PAPR-based CDE method and the signal-peak-based CDE method may process about 16 blocks of 512 sample points to obtain a converged CD estimate. However, the signal-peak-based CDE method may compute the cost function as described above in Equation (2) without multiplications, divisions, and/or squared operations. As such, the disclosed signal-peak-based CDE method may enable an efficient DSP and/or less expensive hardware.

Figure 8:
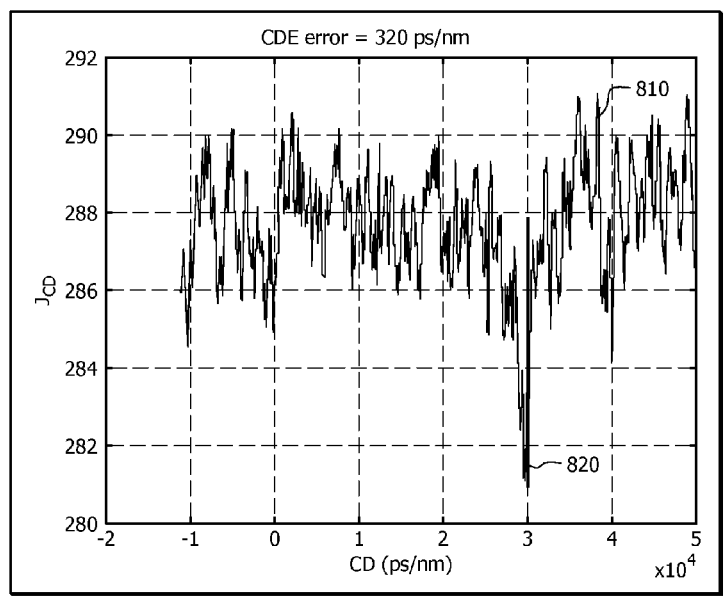
FIG. 8 is a graph showing an embodiment of a CD cost function in the presence of CD and narrow band electrical filters.

FIG. 8 is a graph 800 showing an embodiment of a CD cost function in the presence of CD and narrow band electrical filters, where the amount of CD may be at about 30,000 ps/nm and the electrical filters may comprise bandwidths of about 12.2 gigahertz (GHz). In graph 800, the x-axis represents the amount of CD in units of ps/nm and the y-axis represents signal-peak-based CD costs $J_{CD}$ computed according to the signal-peak-based cost function described above in Equation (2). The curve 810 may represent signal-peak-based CD costs of a 61 gigabits per second (Gbps) baud rate QPSK signal filtered by FDEQs of varying amounts of CD compensation. The curve 810 may be generated by employing substantially similar mechanisms as described with respect to the digital receiver processing modules 300, 400 and the methods 500, 600. As can be seen, a minimum CD cost occurs at about 30,000 ps/nm (marked as 820 in graph 800) with a CDE error of about 320 ps/nm. As such, the signal-peak-based cost function may provide a substantially accurate CD estimate in the presence of narrow band electrical filters.

Figure 9:
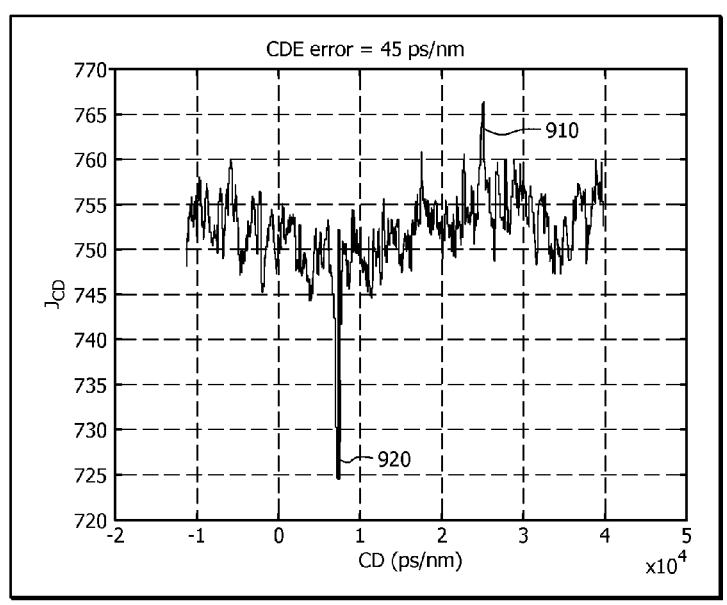
FIG. 9 is a graph showing an embodiment of a CD cost function in the presence of CD and wavelength selective switches (WSSs).

FIG. 9 is a graph 900 showing an embodiment of a CD cost function in the presence of CD and WSSs, where the amount of CD may be at about −75,000 ps/nm and the number of WSSs may be about 8. In graph 900, the x-axis represents the amount of CD in units of ps/nm and the y-axis represents signal-peak-based CD costs $J_{CD}$ computed according to the signal-peak-based cost function described above in Equation (2). The curve 910 may represent signal-peak-based CD cost values of a 45.75 Gbps baud rate 8-QAM signal filtered by FDEQs of varying amount of CD compensation. The curve 910 may be generated by employing substantially similar mechanisms as described with respect to the digital receiver processing modules 300, 400 and the methods 500, 600. As can be seen, a minimum CD cost occurs at about −75,000 ps/nm (marked as 920) with a CDE error of about 45 ps/nm. As such, the signal-peak-based cost function may provide a substantially accurate CD estimate in the presence of a large number of WSSs.

Figure 10:
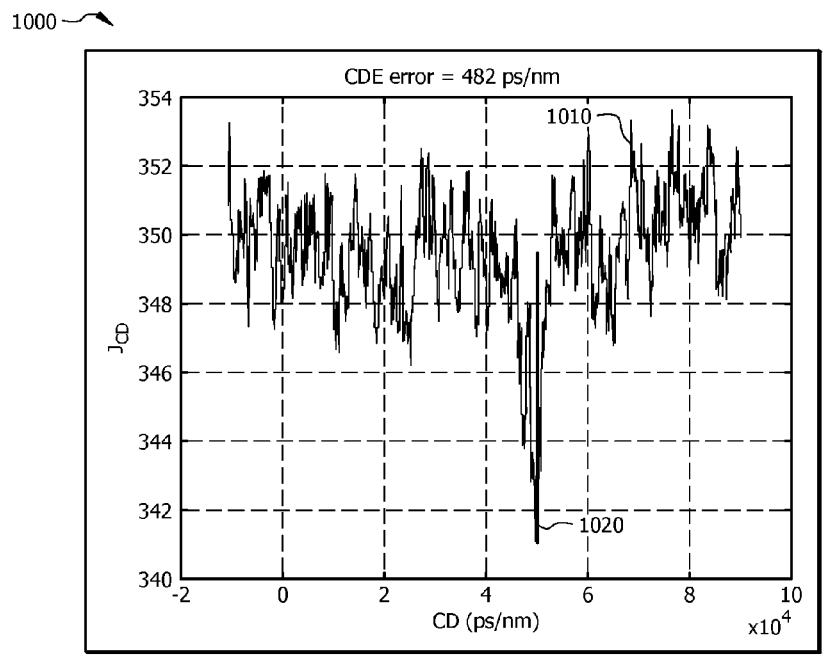
FIG. 10 is a graph showing an embodiment of a CD cost function in the presence of CD and other channel impairments.

FIG. 10 is a graph 1000 showing an embodiment of a CD cost function in the presence of CD and other channel impairments, where the amount of CD may be at about 50,000 ps/nm and the other channel impairments may include LOFO of about 5 GHz, DGD of about 75 picoseconds (ps), and PDL of about 6 decibel (dB). In graph 1000, the x-axis represents the amount of CD in units of ps/nm and the y-axis represents signal-peak-based CD costs $J_{CD}$ computed according to the signal-peak-based cost function described above in Equation (2). The curve 1010 may represent signal-peak-based CD cost values of a 34 Gbps baud rate QPSK signal filtered by FDEQs of varying amount of CD compensation. The curve 1010 may be generated by employing substantially similar mechanisms as described with respect to the digital receiver processing modules 300, 400 and the methods 500, 600. As can be seen, a minimum CD cost occurs at about 50,000 ps/nm (marked as 1020) with a CDE error of about 482 ps/nm. As such, the signal-peak-based cost function may provide a substantially accurate CD estimate in the presence of high channel impairments.

Figure 11:
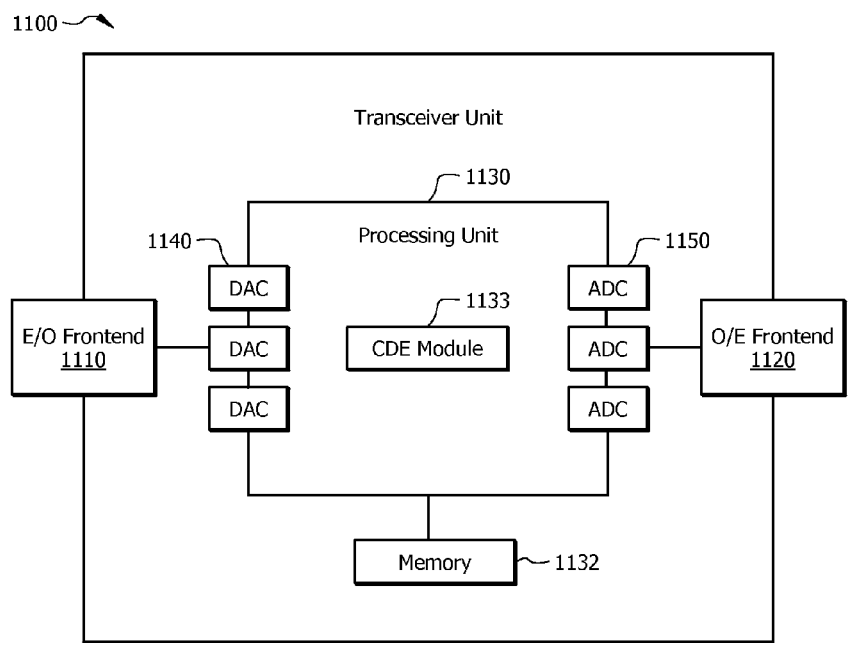
FIG. 11 is a schematic diagram of an embodiment of a transceiver unit.

FIG. 11 is a schematic diagram of an embodiment of a transceiver unit 1100, which may be any device that transmits and/or receives optical signals with encoded data. For example, the transceiver unit 1100 may be located in an optical communication system, such as optical communication system 100, which may implement transmitter 110 and the receiver 130. The transceiver unit 1100 may also be configured to implement or support any of the schemes described herein, such as method 500 and/or 600. In some embodiments transceiver unit 1100 may also act as other node(s) in an optical transport network (OTN), such as an optical line terminal (OLT), an optical network unit (ONU), and/or other optical network elements. One skilled in the art will recognize that the term transceiver unit encompasses a broad range of devices of which transceiver unit 1100 is merely an example. Transceiver unit 1100 is included for purposes of clarity of discussion, but is in no way meant to limit the application of the present disclosure to a particular transceiver unit embodiment or class of transceiver unit embodiments. At least some of the features/methods described in the disclosure may be implemented in a network apparatus or component such as a transceiver unit 1100. For instance, the features/methods in the disclosure may be implemented using hardware, firmware, and/or software installed to run on hardware. As shown in FIG. 11, the transceiver unit 1100 may comprise an E/O frontend 1110 and/or an optical-to-electrical (O/E) frontend 1120, which may convert an electrical signal to an optical signal for transmission in an OTN and/or receive an optical signal from the OTN and convert the optical signal to an electrical signal, respectively. A processing unit 1130 may be coupled to the E/O frontend 1110 and the O/E frontend 1120 via a plurality of DACs 1140 and ADCs 1150, respectively, which may or may not be part of the processing unit 1130. The DACs 1140 may convert digital electrical signals generated by the processing unit 1130 into analog electrical signals that may be fed into the E/O frontend 1110. The ADCs 1050 may convert analog electrical signals received from the O/E frontend 1120 into digital electrical signals that may be processed by the processing unit 1130. The processing unit 1130 may comprise one or more processors, which may include general processors, single-coreprocessors, multi-core processors, ASICs, and/or DSPs. The processing unit 1130 may comprise a CDE module 1133, which may be substantially similar to the CDE module 350, be substantially similar to at least a portion of the digital receiver processing module 400, and implement the methods 500, 600. In an alternative embodiment, the CDE module 1133 may be implemented as instructions stored in the memory molule 1132, which may be executed by processing unit 1130. The memory module 1132 may comprise a cache for temporarily storing content, e.g., a Random Access Memory (RAM). Additionally, the memory module 1132 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the transceiver unit 1100, at least one of the processing unit 1130 and/or memory module 1132 are changed, transforming the transceiver unit 1100 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design, numbers of units to be produced, and/or clock speed requirements rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose CPU inside a computer system) in a computer system (e.g., the transmitter 110 or the receiver 130) to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. An apparatus comprising:
a front end configured to:
  receive an optical data signal; and
  convert the optical data signal into a plurality of digital data signals; and
a processor coupled to the front end and configured to:
  determine a best-match chromatic
dispersion (CD) estimate associated with the optical data signal by:

determining peaks of each component of the plurality of digital data signals;
accumulating the peaks to determine costs for CD candidate values, wherein the
costs are accumulations of the peaks;
minimizing the costs; and
setting the best-match CD estimate based on the minimizing.

2. The apparatus of claim 1, wherein the processor is further configured to:
generate a plurality of digital filters, each configured to compensate the CD candidate values;
apply at least some of the plurality of digital filters to the plurality of digital data signals to produce filtered signals; and
compute a cost from among the costs for each CD candidate value from the filtered signals according to a cost function representing the accumulating.

3. The apparatus of claim 2, wherein the CD candidate values range from a minimum CD candidate value to a maximum CD candidate value, and wherein the minimum CD candidate value and the maximum CD candidate value are associated with an optical network configuration.

4. The apparatus of claim 2, wherein, to optimize the cost function, the processor is further configured to search for a minimum cost value over the costs, and wherein, to determine the best-match CD estimate, the processor is further configured to set the best-match CD estimate to a corresponding CD candidate value that produces the minimum cost value.

5. The apparatus of claim 2, wherein the plurality of digital data
signals comprise one or more polarization components, each comprising an in-phase (I)
component and a quadrature-phase (Q) component, wherein each digital filter is applied to the I
component and the Q component of each polarization component, wherein the filtered signals
produced by each digital filter comprise a real component and an imaginary component, and
wherein, to compute the costs for the CD candidate values, the processor is further configured to
accumulate a maximum signal peak magnitude of each of the real component and the imaginary
component of each polarization component for each CD candidate value.

6. The apparatus of claim 5, wherein the digital filters are frequency domain filters, and wherein the processor is further configured to:
transform each polarization component into frequency domain signals prior to applying the plurality of digital filters; and
transform each filtered signal into a time domain signal prior to computing the costs.

7. The apparatus of claim 5, wherein the processor is further configured to compute an optimum filter for each polarization component according to the best-match CD estimate such that the optimum filter compensates a CD effect of the best-match CD estimate in a corresponding polarization component.

8. The apparatus of claim 1, wherein the optical data signal comprises a binary phase shift keying (BPSK) signal, a quadrature phase shift keying (QPSK) signal, an eight quadrature amplitude modulation (8-QAM) signal, a sixteen quadrature amplitude modulation (16-QAM) signal, or combinations thereof.

9. The apparatus of claim 1, wherein the optical data signal comprises a raised-cosine (RC) signal, a root-raised-cosine (RRC) signal, a non-return-to-zero (NRZ) signal, a return-to-zero with 67 percent duty cycle (RZ67) signal, or combinations thereof.

10. The apparatus of claim 1, wherein the processor is a digital signal processor (DSP).

11. The apparatus of claim 1, wherein each digital data signal in the plurality of digital data signals is an electrical signal.

12. The apparatus of claim 1, wherein the processor is further configured to determine the best-match CD estimate independent of a multiplication operation.

13. A coherent optical receiver comprising:
a chromatic dispersion (CD) sweep unit;
a first frequency domain equalizer (FDEQ) coupled to the CD sweep unit;
a first signal peak detector coupled to the first FDEQ;
a second signal peak detector coupled to the first FDEQ;
a first accumulator coupled to the first signal peak detector and the second signal peak detector;
a second FDEQ coupled to the CD sweep unit;
a third signal peak detector coupled to the second FDEQ;
a fourth signal peak detector coupled to the second FDEQ;
a second accumulator coupled to the third signal peak detector and the fourth signal peak detector;
a third accumulator coupled to the first accumulator and the second accumulator; and
a CD cost optimizer coupled to the third accumulator.

14. A method for estimating chromatic dispersion (CD) in an optical device coupled to an optical transmission link, the method comprising:
receiving an optical data signal via the optical transmission link;
converting the optical data signal into a plurality of digital data signals;
determining peaks of each component of the plurality of digital data signals;
accumulating the peaks to determine costs for CD candidate values, wherein the costs are accumulations of the peaks;
minimizing the costs; and
determining a best-match CD estimate associated with the optical data signal based on the minimizing.

15. The method of claim 14 further comprising:
generating a plurality of digital filters, each configured to compensate the CD candidate values;
applying at least some of the plurality of digital filters to the plurality of digital data signals to produce filtered signals; and
computing a cost from among the costs for each CD candidate value from the filtered signals according to a cost function representing the accumulating.

16. The method of claim 15, wherein the plurality of digital data signals comprises one or more polarization components, each comprising an in-phase (I) component and a quadrature-phase (Q) component, wherein each digital filter is applied to the I component and the Q component of each polarization component, wherein the filtered signal produced by each digital filter comprises a real component and an imaginary component, and wherein computing the costs for the CD candidate values further comprises accumulating a maximum signal peak magnitude of each of the real component and the imaginary component of each polarization component for each CD candidate value.

17. The method of claim 15, wherein the plurality of digital data signals comprises one or more polarization components, and wherein the plurality of digital filters are frequency domain filters, and wherein the method further comprises:
performing a fast Fourier transform (FFT) to convert in-phase (I) and quadrature-phase (Q) components of each polarization component into a frequency domain prior to applying the plurality of digital filters; and
performing an inverse FFT (IFFT) to convert each filtered signal into a time domain prior to computing the costs.

18. The method of claim 15, further comprising searching for a minimum cost value over the costs, and wherein determining the best-match CD estimate comprises setting the best-match CD estimate to a CD candidate value that produces the minimum cost value.

19. The method of claim 14, wherein each digital data signal in the plurality of digital data signals is an electrical signal.

20. A coherent optical receiver comprising:
a front end configured to:
receive an optical data signal; and
convert the optical data signal into a plurality of digital data signals;
one or more frequency domain equalizers (FDEQs) coupled to an output of the front end and configured to:
receive the plurality of digital data signals; and
compensate chromatic dispersion (CD) in the optical data signal; and
a CD estimator (CDE) coupled to the FDEQs and configured to:
determine peaks of each component of the plurality of digital data signals;
accumulate the peaks to determine costs for CD candidate values, wherein the costs are accumulations of the peaks;
minimize the costs; and
determine a best-match CD estimate associated with the optical data signal based on the minimizing,
wherein the FDEQs are further configured to use the best-match CD estimate to compensate the CD in the optical data signal.

21. The coherent optical receiver of claim 20, wherein the CDE is further configured to configure the FDEQs with the CD candidate values, and wherein, for each CD candidate value, the CDE is further configured to:
compute coefficients for the FDEQs such that the FDEQs equalize a CD effect of a corresponding CD candidate value;
apply the FDEQs to the plurality of digital data signals to produce equalized signals; and
compute a cost from among the costs for the corresponding CD candidate value from the equalized signals according to a cost function representing the accumulating.

22. The coherent optical receiver of claim 21, wherein to optimize the cost function, the CDE is further configured to search for a minimum cost value over the costs, and wherein, to determine the best-match CD estimate, the CDE is further configured to set the best-match CD estimate to a corresponding CD candidate value that produces the minimum cost value.

23. The coherent optical receiver of claim 21, wherein the plurality of digital data signals comprises one or more polarization components, wherein each FDEQ equalizes one of the polarization components, wherein each equalized polarization component comprises a real component and an imaginary component, and wherein, to compute the cost for the corresponding CD candidate value, the CDE is further configured to accumulate a maximum signal peak magnitude of each of the real component and the imaginary component of each polarization component.

24. The coherent optical receiver of claim 21, wherein the plurality of digital data signals comprises one or more polarization components, each comprising an in-phase (I) component and a quadrature phase (Q) component, and wherein each FDEQ comprises:
a fast Fourier transform (FFT) unit configured to transform the I component and the Q component of each polarization component into a frequency domain signal;
a frequency domain filter coupled to the FFT unit and configured to compensate CD in the frequency domain signal to create a CD compensated signal, wherein the coefficients correspond to frequency domain filter coefficients; and
an inverse FFT (IFFT) unit coupled to the frequency domain filter and configured to transform the CD compensated signal into a complex time domain signal.

25. The coherent optical receiver of claim 20, wherein the CDE is further configured to configure the FDEQs according to the best-match CD estimate.

26. The coherent optical receiver of claim 20, wherein each digital data signal in the plurality of digital data signals is an electrical signal.

* * * * *